(12) United States Patent
Nakayama et al.

(10) Patent No.: US 11,992,869 B2
(45) Date of Patent: May 28, 2024

(54) ARM-LIKE-STRUCTURE PRODUCING METHOD AND ARM-LIKE STRUCTURE

(71) Applicants: FANUC CORPORATION, Yamanashi (JP); TUBE FORMING CO., LTD., Kanagawa (JP)

(72) Inventors: Kazutaka Nakayama, Yamanashi (JP); Kenichiro Abe, Yamanashi (JP); Masahiro Morioka, Yamanashi (JP); Yasutoyo Ooki, Kanagawa (JP); Keiichi Tsuchiya, Kanagawa (JP)

(73) Assignees: FANUC CORPORATION, Yamanashi (JP); TUBE FORMING CO., LTD., Yokohama (JP)

( * ) Notice: Subject to any disclaimer, the term of this patent is extended or adjusted under 35 U.S.C. 154(b) by 98 days.

(21) Appl. No.: 17/025,232

(22) Filed: Sep. 18, 2020

(65) Prior Publication Data
US 2021/0094095 A1    Apr. 1, 2021

(30) Foreign Application Priority Data

Sep. 30, 2019  (JP) .................................. 2019-180110

(51) Int. Cl.
*B25J 18/00*       (2006.01)
*B21D 7/00*        (2006.01)
*B21D 26/033*      (2011.01)

(52) U.S. Cl.
CPC .............. *B21D 26/033* (2013.01); *B21D 7/00* (2013.01); *B25J 18/005* (2013.01)

(58) Field of Classification Search
CPC ........... B25J 18/00; B25J 18/005; B21D 7/00; B21D 26/033
See application file for complete search history.

(56) References Cited

U.S. PATENT DOCUMENTS

| | | | |
|---|---|---|---|
| 5,662,349 | A | 9/1997 | Hasshi et al. |
| 6,158,122 | A | 12/2000 | Skudutis |

(Continued)

FOREIGN PATENT DOCUMENTS

| | | | |
|---|---|---|---|
| CN | 205043767 | * | 2/2016 |
| CN | 107488820 | A | 12/2017 |

(Continued)

OTHER PUBLICATIONS

Notice of Reasons for Refusal dated Feb. 2, 2022, in connection with corresponding Japanese Application No. 2019-180110 (7 pp., including machine-generated English translation).

(Continued)

*Primary Examiner* — William C Joyce
(74) *Attorney, Agent, or Firm* — Maier & Maier, PLLC

(57) ABSTRACT

A method for producing an arm structure in which the arm structure is produced by: forming an arm precursor member having an external shape of the arm structure by, in a state in which a die is closed with a metal pipe member being disposed in a cavity thereof, pressurizing the pipe member with liquid supplied to an inside thereof to cause an external surface of the thus expanded pipe member to be pressed against an inner surface of the cavity; and forming a flange portion to be attached to a driven body by machining at least an end of the formed arm precursor member.

11 Claims, 17 Drawing Sheets

(56) References Cited

U.S. PATENT DOCUMENTS

| | | | |
|---|---|---|---|
| 6,634,851 B1* | 10/2003 | Bonora | H01L 21/68707 414/744.3 |
| 6,739,166 B1 | 5/2004 | Shah | |
| 10,011,028 B2* | 7/2018 | Johnson | B25J 18/04 |
| 2005/0092122 A1 | 5/2005 | Markert et al. | |
| 2007/0040345 A1 | 2/2007 | Hardtke et al. | |
| 2009/0114053 A1* | 5/2009 | Mikaelsson | B25J 9/0009 901/42 |
| 2011/0154937 A1* | 6/2011 | Liu | B25J 19/00 277/404 |
| 2013/0009390 A1 | 1/2013 | Charest et al. | |
| 2014/0239038 A1 | 8/2014 | Leimbach et al. | |
| 2014/0283642 A1* | 9/2014 | Harada | B25J 18/04 74/490.05 |
| 2016/0137232 A1 | 5/2016 | Charest et al. | |
| 2018/0147734 A1* | 5/2018 | Nakayama | F16B 7/18 |
| 2018/0169760 A1* | 6/2018 | Negishi | B22F 7/08 |
| 2018/0290293 A1* | 10/2018 | Nakayama | B25J 9/0024 |

FOREIGN PATENT DOCUMENTS

| | | |
|---|---|---|
| EP | 2772198 A1 | 9/2014 |
| GB | 2291382 A | 1/1995 |
| JP | 51136338 U | 11/1976 |
| JP | 5877720 A | 5/1983 |
| JP | 825929 A | 1/1996 |
| JP | 8281580 A | 10/1996 |
| JP | 938717 A | 2/1997 |
| JP | 9125600 A | 5/1997 |
| JP | 11344172 A | 12/1999 |
| JP | 2002503578 A | 2/2002 |
| JP | 2002219526 A | 8/2002 |
| JP | 2006162059 A | 6/2006 |
| JP | 2006527132 A | 11/2006 |
| JP | 2007210027 A | 8/2007 |
| JP | 2013-018058 A | 1/2013 |
| JP | 2013-517141 A | 5/2013 |
| JP | 2016-508421 A | 3/2016 |
| JP | 2018176337 A | 11/2018 |
| WO | 9942312 A1 | 8/1999 |
| WO | 2011/088554 A1 | 7/2011 |
| WO | 2014/133861 A | 9/2014 |

OTHER PUBLICATIONS

Search Report dated Dec. 28, 2021, in connection with corresponding Japanese Application No. 2019-180110 (18 pp., including machine-generated English translation).

Japanese Office Action dated Aug. 23, 2022 in corresponding Japanese Application No. 2019-180110; (8 pages, including English translation).

* cited by examiner

ARM-LIKE-STRUCTURE PRODUCING METHOD AND ARM-LIKE STRUCTURE

CROSS-REFERENCE TO RELATED APPLICATIONS

This application is based on Japanese Patent Application No. 2019-180110, the content of which is incorporated herein by reference.

FIELD

The present disclosure relates to an arm-like-structure producing method and an arm-like structure.

BACKGROUND

Typically, an arm of an industrial robot is formed by casting a metal, such as an aluminum alloy, to ensure strength while reducing weight (for example, see Japanese Unexamined Patent Application Publication No. 2013-018058).

SUMMARY

An aspect of the present disclosure is an arm-like-structure producing method in which an arm-like structure is produced by: forming an arm precursor member having an external shape of the arm-like structure by, in a state in which a die is closed with a metal pipe member being disposed in a cavity thereof, pressurizing the pipe member with liquid supplied to an inside thereof to cause an external surface of the thus expanded pipe member to be pressed against an inner surface of the cavity; and forming a flange portion to be attached to a driven body by machining at least an end of the formed arm precursor member.

DETAILED DESCRIPTION

An arm-like structure 1 and a method for producing the arm-like structure 1 according to an embodiment of the present disclosure will be described below with reference to the drawings.

Figure 1:
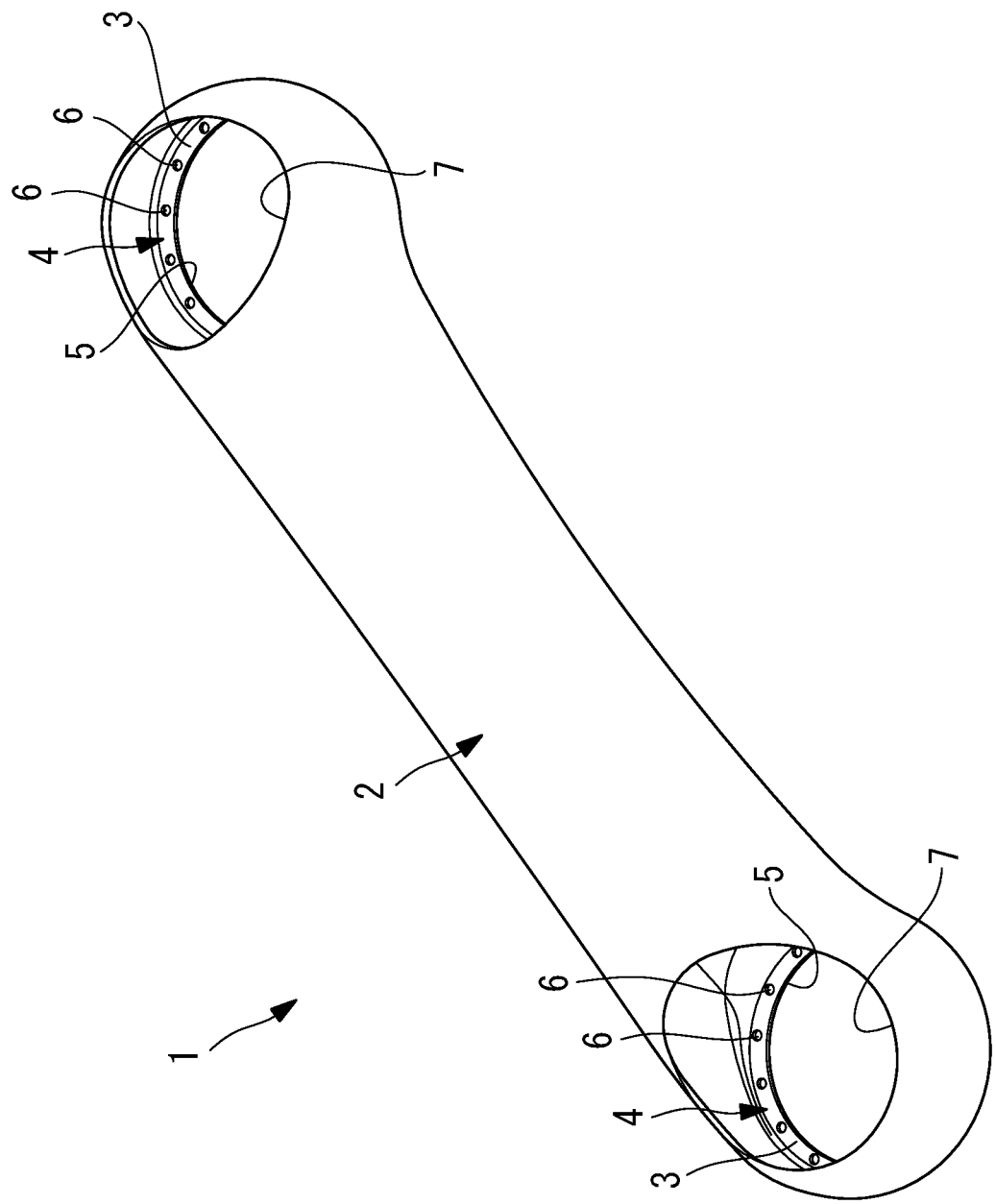
FIG. 1 is a perspective view showing an example arm-like structure produced by an arm-like-structure producing method according to an embodiment of the present disclosure.

The method for producing the arm-like structure 1 according to this embodiment is a method for producing, for example, the arm-like structure 1 shown in FIG. 1.

The arm-like structure 1 according to this embodiment is, for example, a robot arm and is formed as a single component from a metal, such as an aluminum alloy. The arm-like structure 1 has a pair of ring-shaped flange portions 4 at the ends of a pipe-like portion (pipe member) 2 having a smoothly changing external shape in cross section, the flange portions 4 having flange surfaces 3 located on the same plane parallel to the central axis of the pipe-like portion 2.

The flange portions 4 have center holes 5 that are open at the centers thereof, and a plurality of through-holes 6 provided at intervals in the circumferential direction, around the center holes 5. The center holes 5 at the flange portions 4 communicate with a hollow part inside the pipe-like portion 2. This structure allows a wire body, such as a cable, to be disposed along a path along which the wire body is inserted from the center hole 5 in one flange portion 4, passes through the pipe-like portion 2, and is taken out from the center hole 5 in the other flange portion 4.

By fastening bolts inserted through the plurality of through-holes 6 provided in the flange portions 4 to an output shaft of another member (driven body), such as a reducer, constituting a robot, the arm-like structure 1 can be easily fixed to the reducer.

The arm-like structure 1 has work openings 7 formed by cutting off shoulder portions (wall portions) facing the flange portions 4 in the central axis direction of the flange portions 4. Fastening of bolts, wiring of the wire body, etc. can be easily performed through the work openings 7.

The method for producing the arm-like structure 1 according to this embodiment will be described below.

Figure 2:
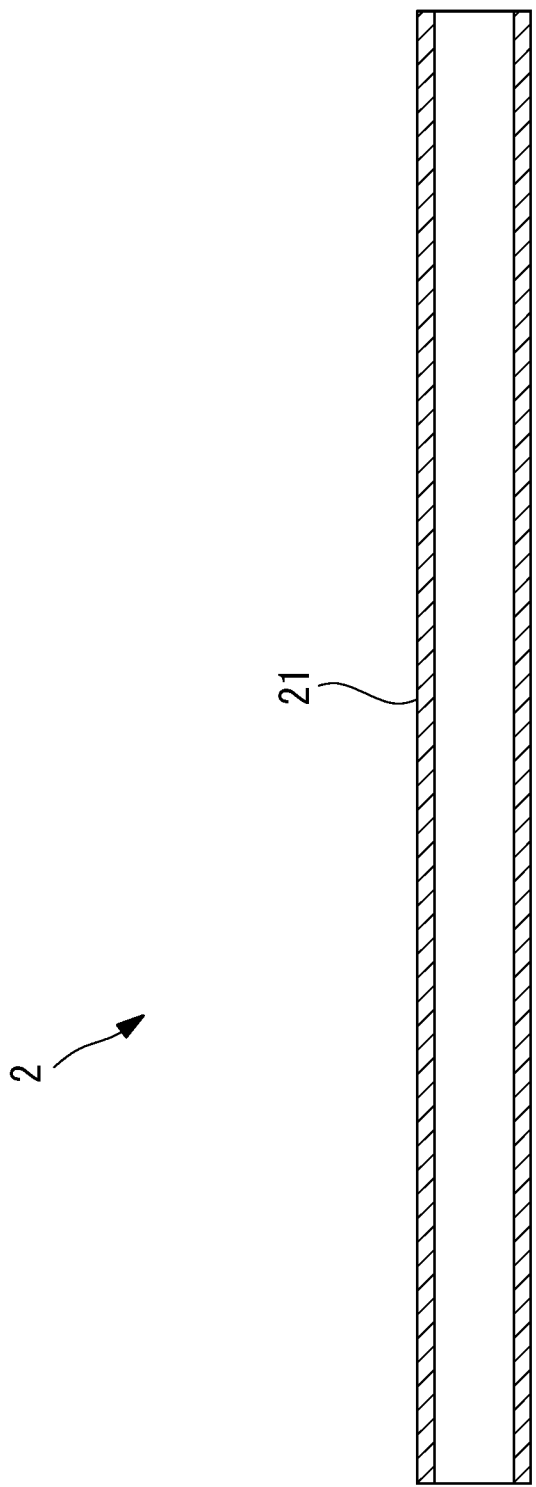
FIG. 2 is a vertical cross section showing a material having a first shape, which is used to produce the arm-like structure in FIG. 1.
Figure 3:
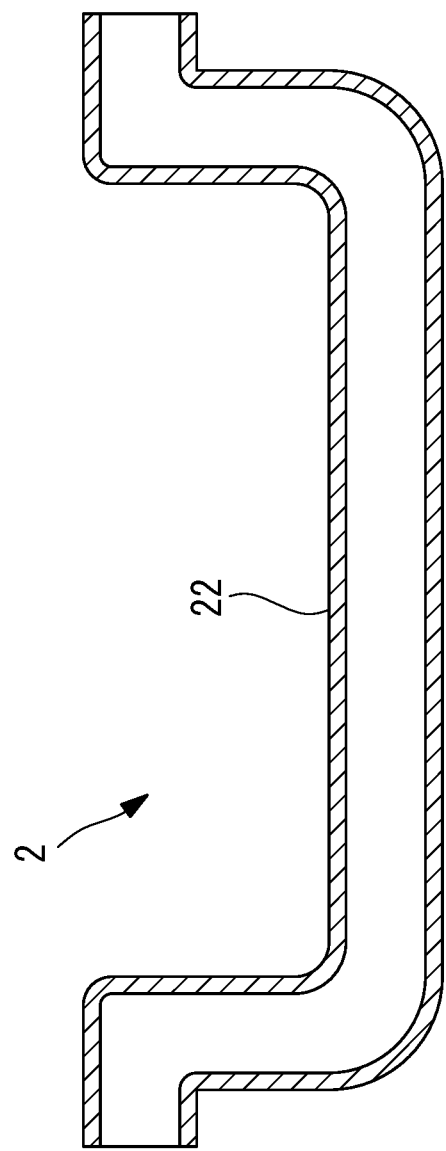
FIG. 3 is a vertical cross section showing a first intermediate member having a second shape, which is formed during production of the arm-like structure in FIG. 1.

In the method for producing the arm-like structure 1 according to this embodiment, first, a crank-shaped (second shape) first intermediate member (material) 22, as shown in FIG. 3, is formed by preparing a straight-pipe-shaped (first shape) material 21 as shown in FIG. 2 and bending the material 21 by bulge forming using a first die 30.

Figure 4:
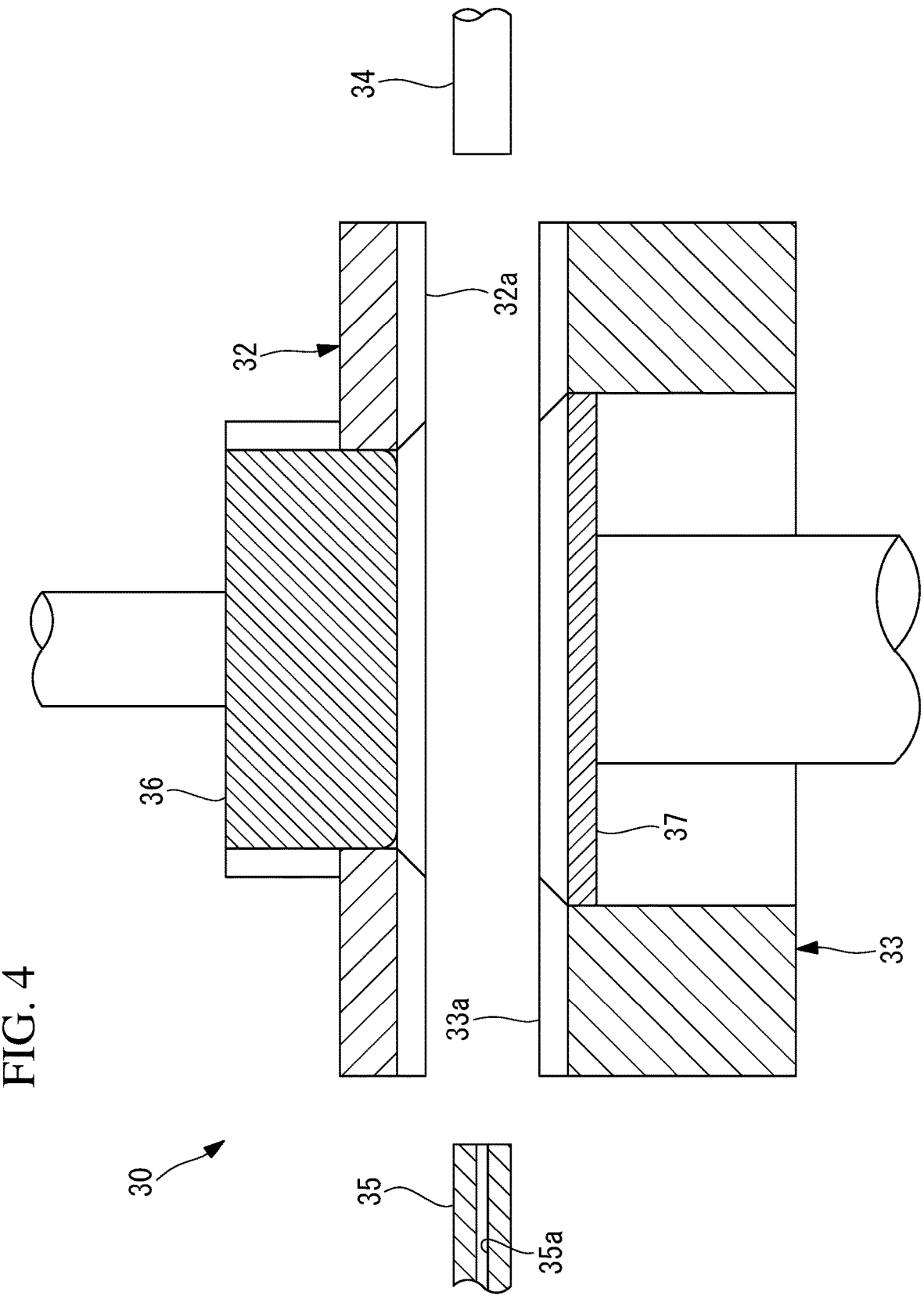
FIG. 4 is a vertical cross section for explaining a first die, in an opened state, used in the method for producing the arm like structure in FIG. 1.

As shown in FIG. 4, the first die 30 includes, for example, an upper die 32 and a lower die 33 that define a horizontally extending cylindrical cavity 31 in which the straight-pipe-shaped material 21 can be set. The first die 30 also includes: a plunger 34 that is to be inserted into the cavity 31 from one end of the cavity 31 and is supported so as to be movable in the length direction of the cavity 31; and a stem 35 that is to be inserted into the cavity 31 from the other end of the cavity 31 and is movable in the length direction.

The upper die 32 and the lower die 33 can be divided along horizontal division surfaces 32a and 33a including the central axis of the cavity 31. The upper die 32 includes an upper movable die 36 that can be moved up and down at the central position in the length direction thereof. The lower die 33 also includes a lower movable die (punch) 37 that can be moved up and down at the central position in the length direction thereof.

Figure 5:
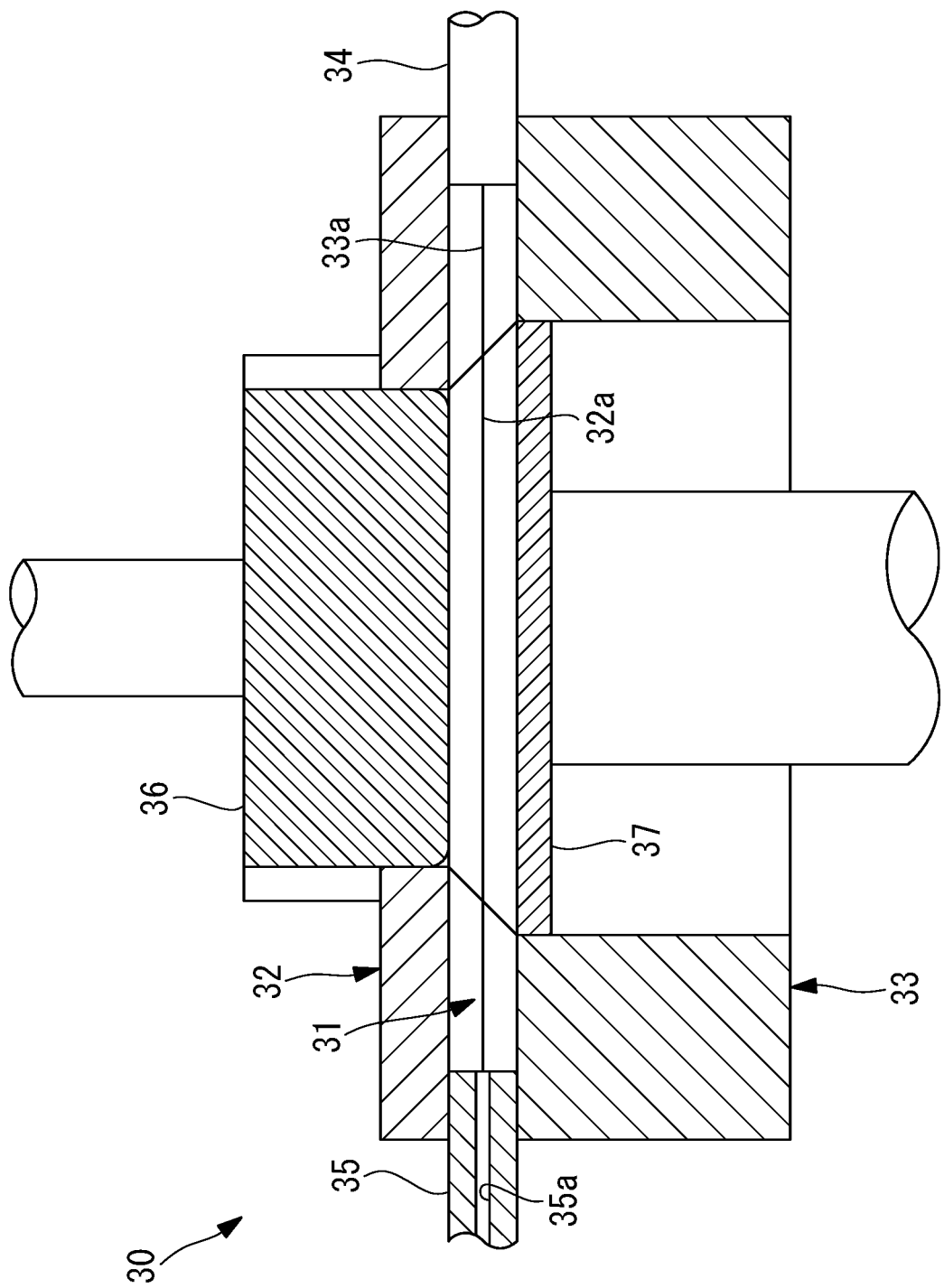
FIG. 5 is a vertical cross section of the first die in FIG. 4 in a closed state.

As shown in FIG. 5, in a state in which the upper movable die 36 and the lower movable die 37 are moved relative to the upper die 32 and the lower die 33 to the positions where the cylindrical cavity 31 is formed, the division surfaces 32a and 33a of the upper die 32 and the lower die 33 are brought into tight contact with each other, and portions of the plunger 34 and the stem 35 are disposed between the upper die 32 and the lower die 33. By doing so, the cylindrical cavity 31 in which the straight-pipe-shaped material 21 can perfectly fit is formed between the upper die 32 and the lower die 33.

The plunger 34 is formed in a cylindrical shape that perfectly fits in the cavity 31 in this state, and can move in the cavity 31 in the length direction while pressing one end of the material 21 in the axial direction.

The stem 35 is also formed in a cylindrical shape that perfectly fits in the cavity 31 in this state, and can move in the cavity 31 in the length direction while pressing the other end of the material 21 in the axial direction.

The stem 35 has a through-hole 35a penetrating in the length direction. By joining a pipe (not shown) to the through-hole 35a, high-pressure liquid L from the pipe can be supplied to the inside of the material 21 through the through-hole 35a. The plunger 34 may also have a through-hole, similarly to the stem 35.

Figure 6:
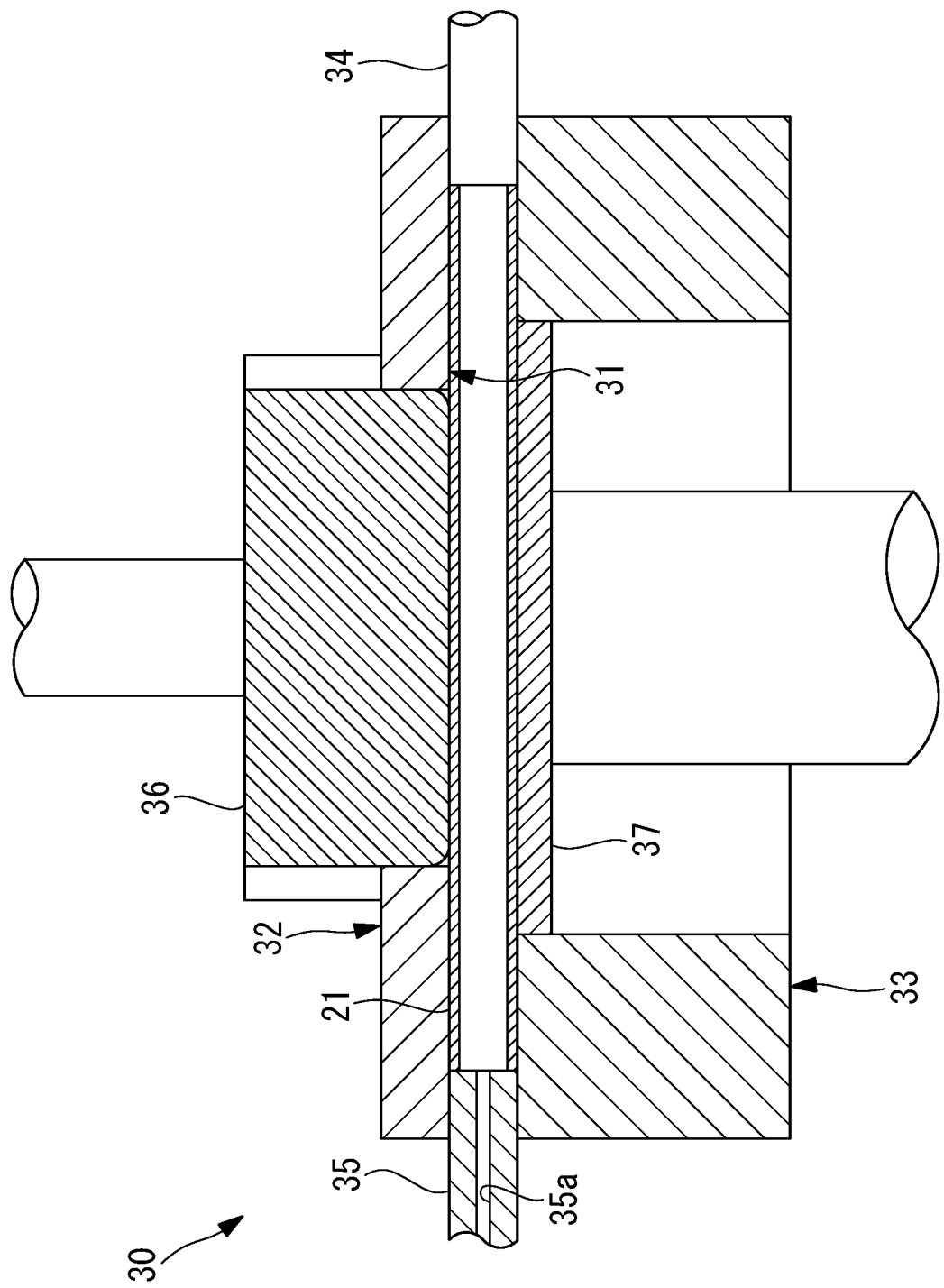
FIG. 6 is a vertical cross section showing a state in which a material is set in a cavity of the first die in FIG. 5.

As shown in FIG. 6, the upper movable die 36 and the lower movable die 37 are brought into a state in which the cavity 31 can be formed, the straight-pipe-shaped material 21 is set between the upper die 32 and the lower die 33, and the division surfaces 32a and 33a of the upper die 32 and the lower die 33 are brought into tight contact. Then, the plunger 34 and the stem 35 are inserted from the ends of the cavity 31 until the ends of the plunger 34 and the stem 35 come into contact with the ends of the material 21. In this state, the high-pressure liquid L is supplied to and charged inside the material 21 through the through-hole 35a in the stem 35.

Figure 7:
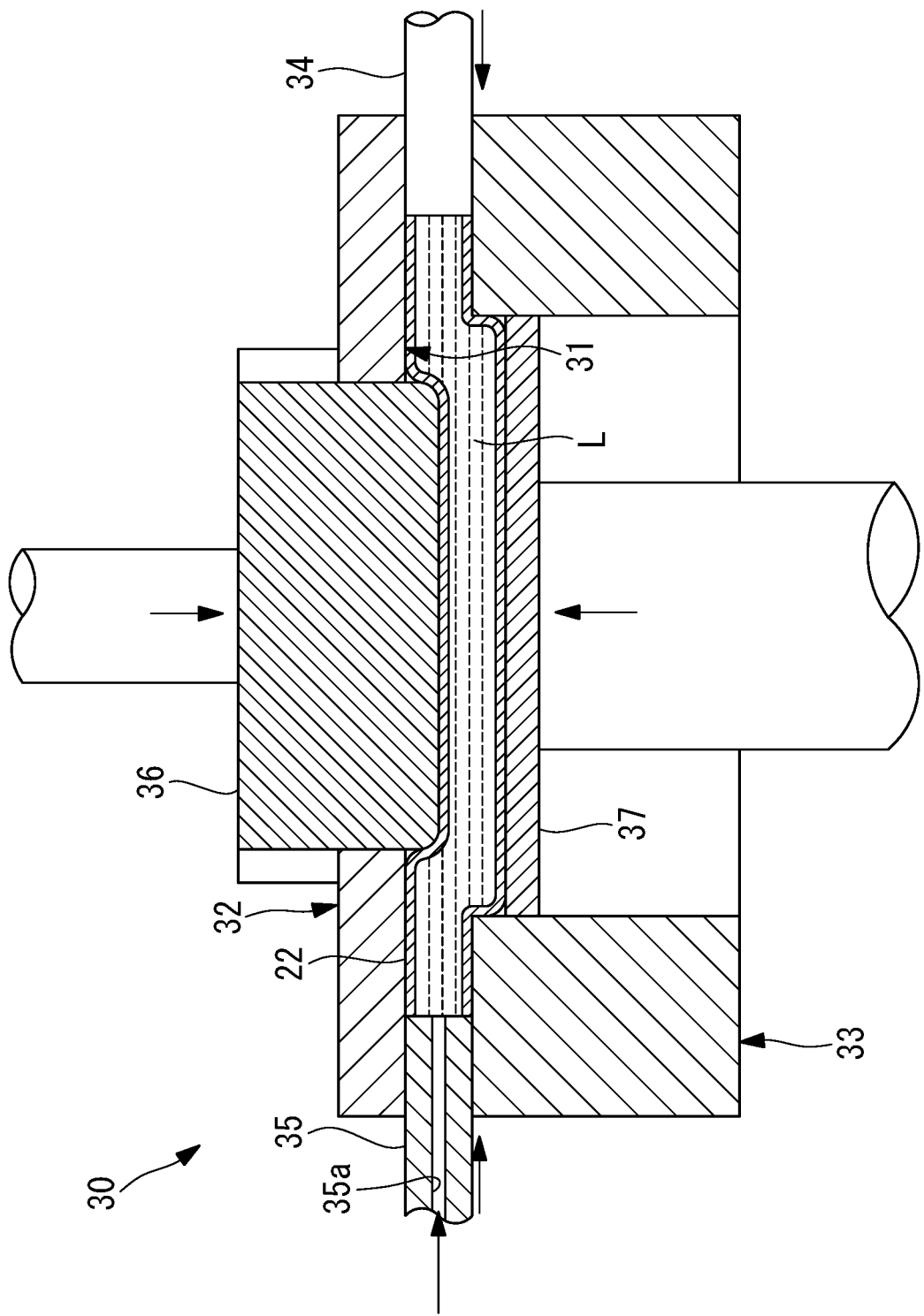
FIG. 7 is a vertical cross section for explaining bulge bending using the first die in FIG. 4.
Figure 8:
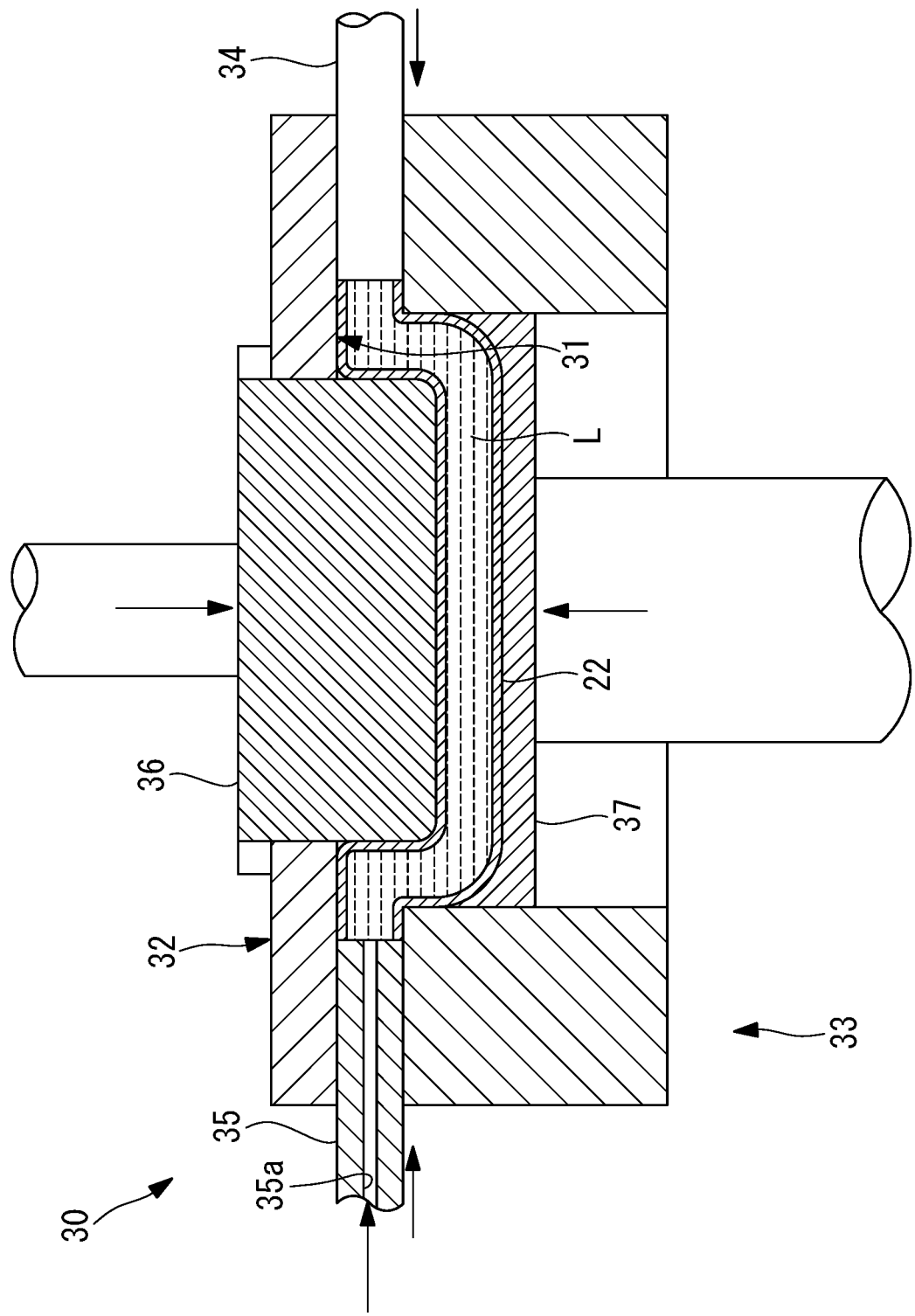
FIG. 8 is a vertical cross section for explaining bulge bending performed after changing an upper movable die of the first die in FIG. 4.

Then, as shown in FIGS. 7 and 8, the upper movable die 36 and the lower movable die 37 are synchronously moved while moving the plunger 34 and the stem 35 in the directions toward each other. As a result, the material 21 in the first die 30 is smoothly deformed from the first shape into the second shape, and a first intermediate member (material) 22 is formed. The second shape is a crank shape in which the ends of the material 21 in the first shape are brought toward each other while being maintained coaxial and in which only the middle portion in the length direction is slid vertically upward or vertically downward.

By exchanging the upper movable die 36 or the lower movable die 37 with one having a rounded surface as shown in FIG. 8 during the bulge forming, a crank-shaped first intermediate member 22 having smooth rounded surfaces at the corners, as shown in FIG. 3, can be formed.

Figure 9:
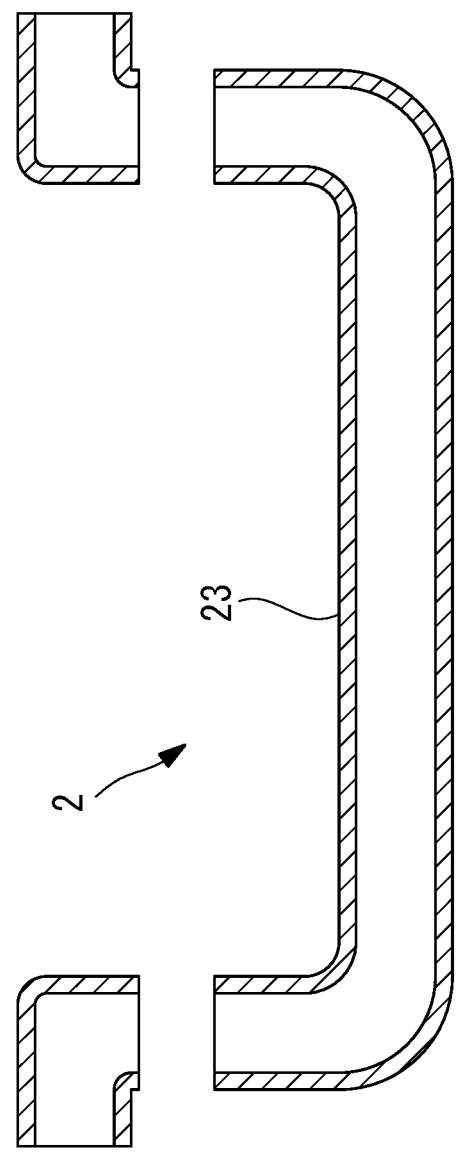
FIG. 9 is a vertical cross section for explaining a state in which ends of the first intermediate member formed by the bulge bending using the first die in FIG. 4 are cut off.

Next, by cutting off the ends of the thus-formed first intermediate member 22 as shown in FIG. 9, a second intermediate member (material) 23 bent in a U shape and having ends that are open in the same direction is formed.

By performing bulge forming on the thus-formed second intermediate member 23 using a second die (die) 40, a third intermediate member 24 is formed.

Figure 10:
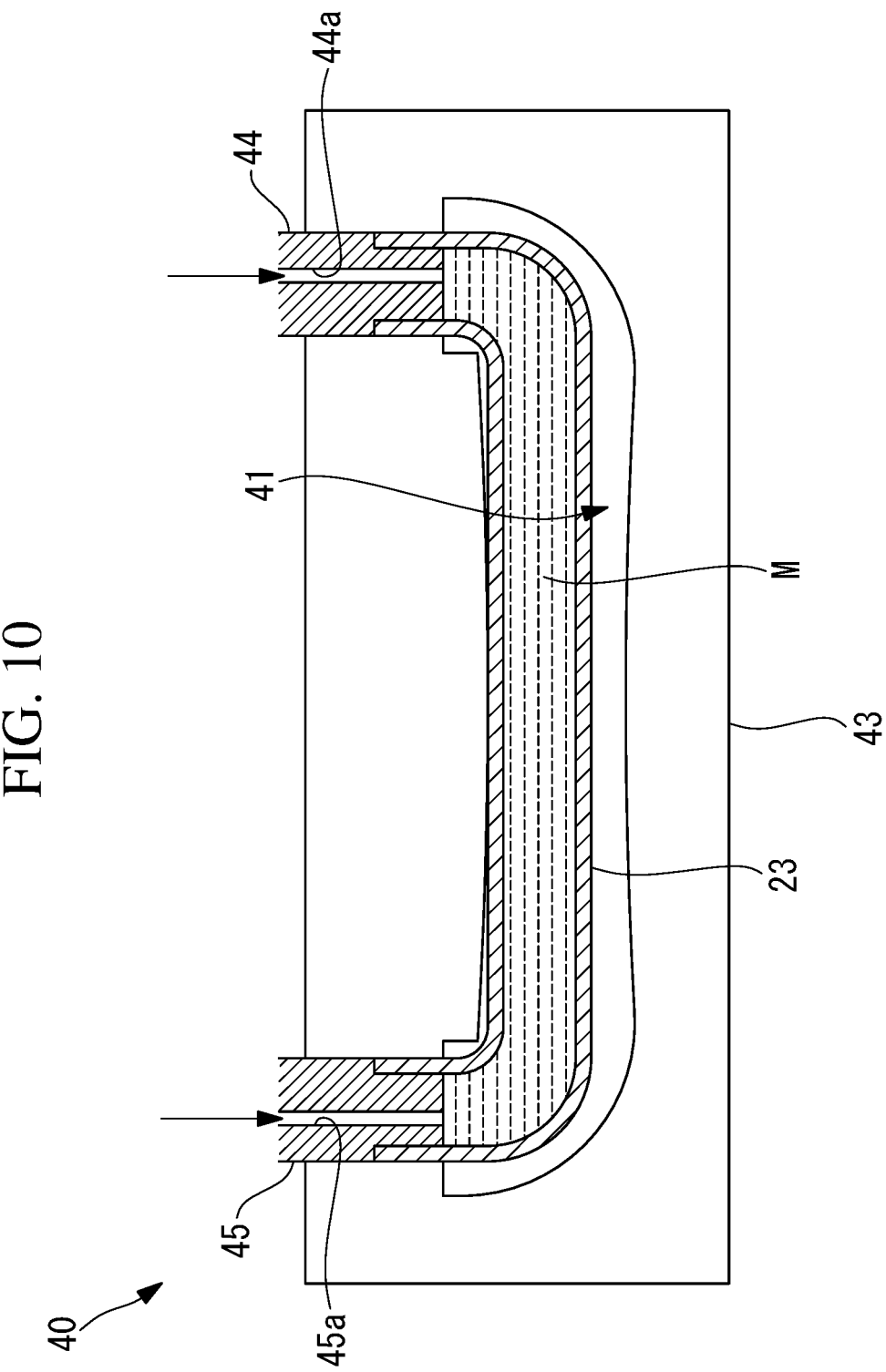
FIG. 10 is a vertical cross section for explaining bulge forming performed in a state in which a second intermediate member formed in FIG. 9 is set in a cavity of a second die.
Figure 11:
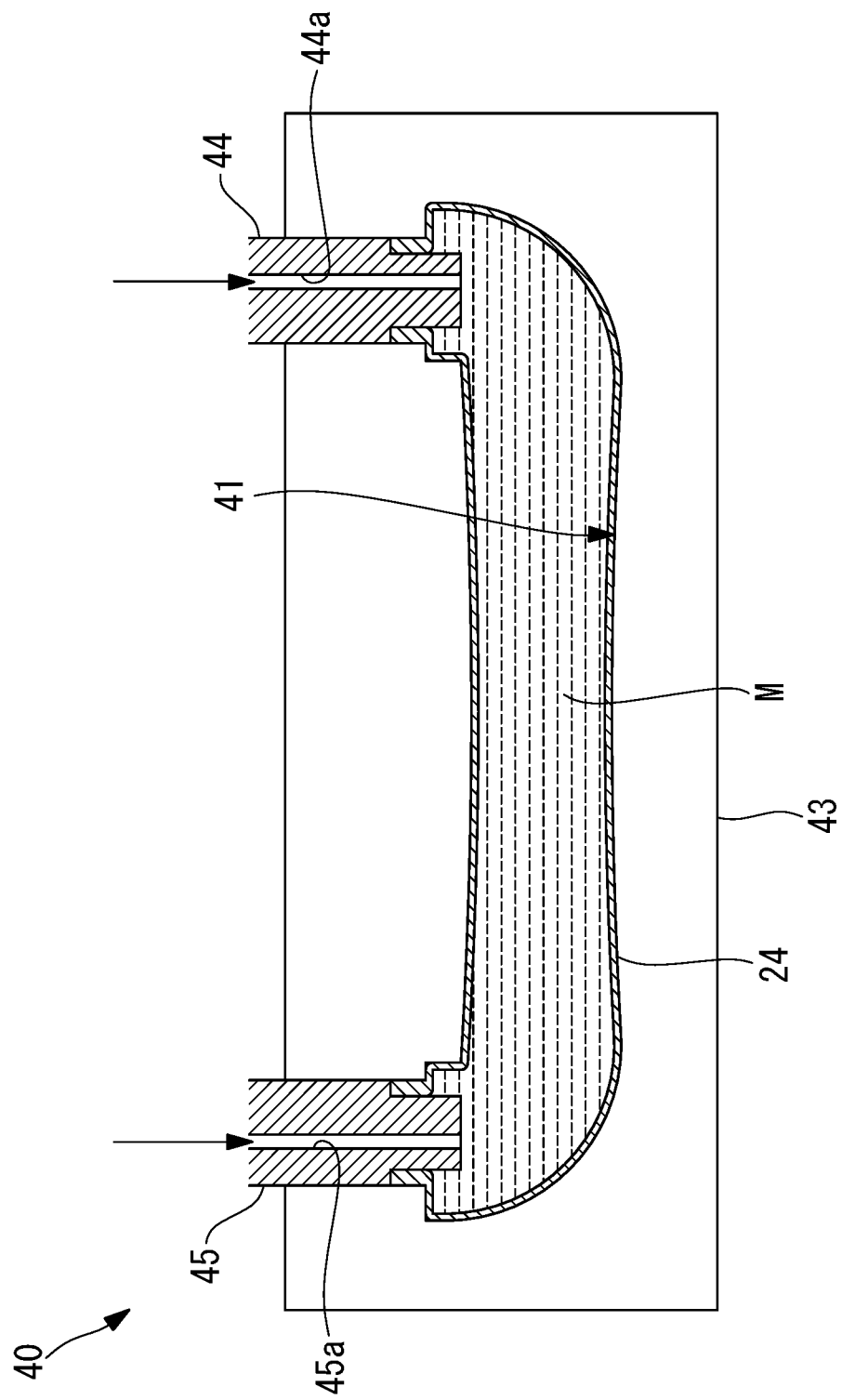
FIG. 11 is a vertical cross section for explaining a state in which the second intermediate member is expanded in the cavity of the second die in FIG. 10 by the bulge forming.

As shown in FIG. 10, the second die 40 includes an upper die and a lower die 43 that can form a cavity 41 larger than the external shape of the second intermediate member 23, and two stems 44 and 45 disposed at ends of the cavity 41. In FIGS. 10 and 11, the upper die (not shown) and the lower die 43 may be stacked in a direction normal to the planes of the sheets of FIGS. 10 and 11, and the cavity 41 may be formed therebetween. Furthermore, FIGS. 10 and 11 show the lower die 43, and the upper die is separated from the lower die 43 in the direction normal to the planes of the sheets of FIGS. 10 and 11.

The second intermediate member 23 is set in the cavity 41 in the second die 40, the second die 40 is closed as shown in FIG. 10, and high-pressure liquid M is supplied to the inside of the second intermediate member 23 through through-holes 44a and 45a in the stems 44 and 45 while the ends of the second intermediate member 23 are sealed with the stems 44 and 45 fitted therein.

By pushing the stems 44 and 45 into the cavity 41 while applying pressure to the second intermediate member 23 with the liquid M in the direction in which the second intermediate member 23 is expanded, the external surface of the expanded second intermediate member 23 is pressed against the cavity 41, as shown in FIG. 11. Thus, the third intermediate member 24 is formed.

Figure 12:
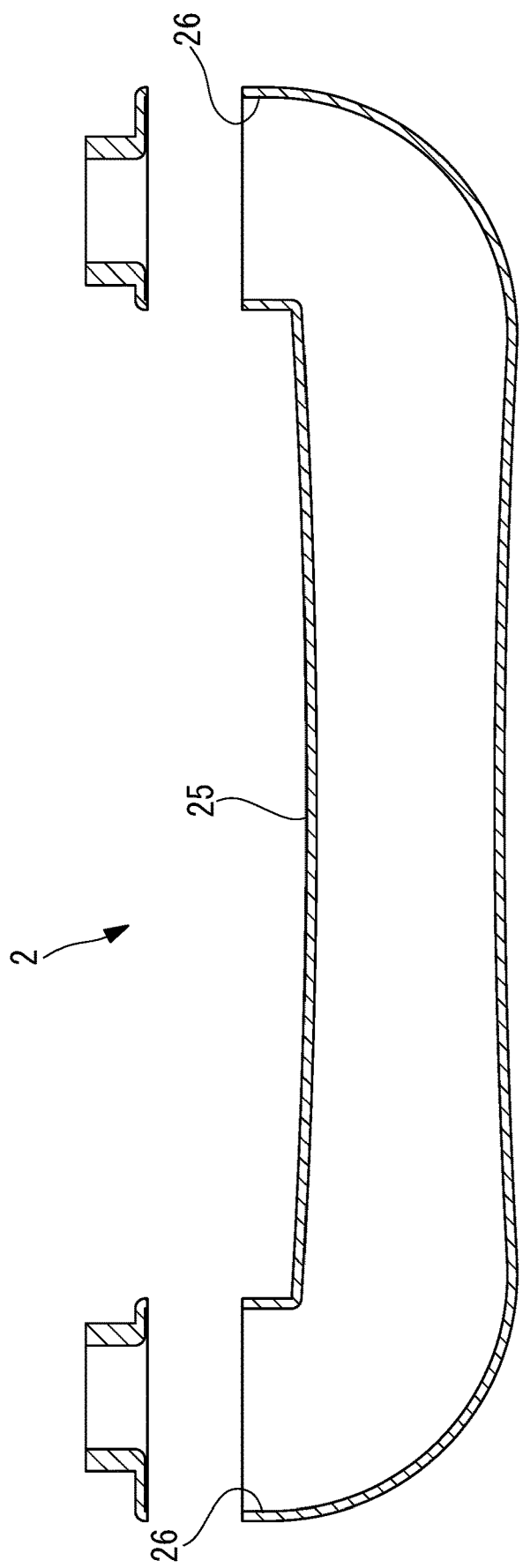
FIG. 12 is a vertical cross section for explaining a state in which ends of a third intermediate member obtained by the bulge forming in FIG. 11 are cut off.
Figure 13:
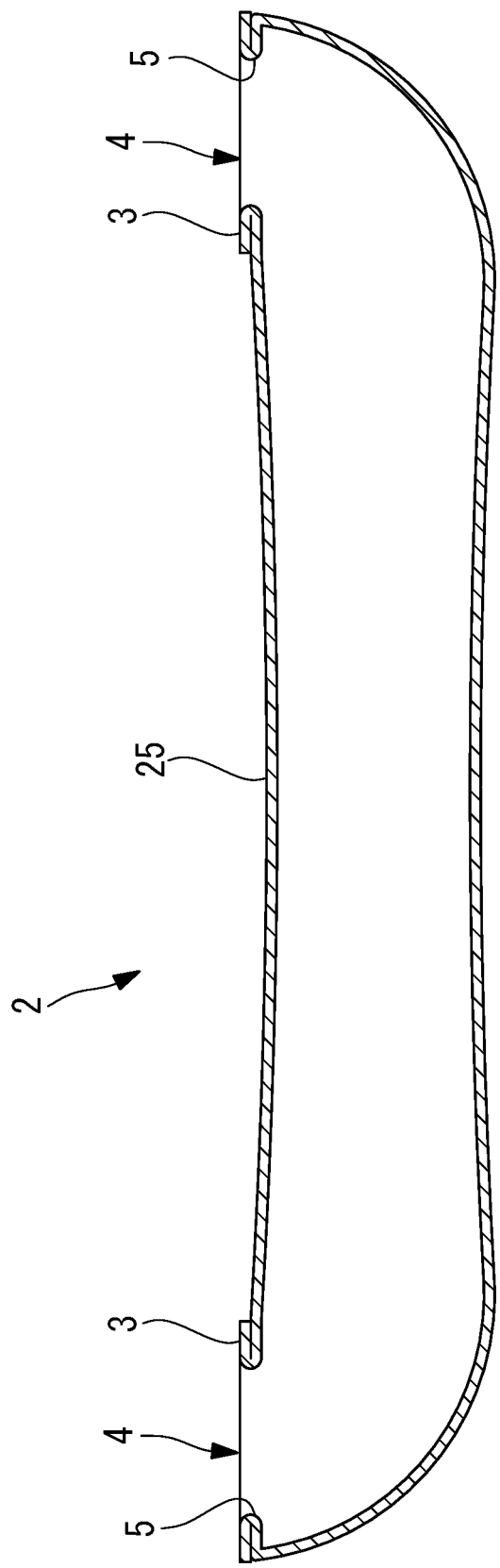
FIG. 13 is a vertical cross section for explaining bending for forming flange portions at the ends of the third intermediate member formed in FIG. 12.

Next, as shown in FIG. 12, by cutting off the ends of the thus-formed third intermediate member 24, an arm precursor member 25 having a pair of openings 26 that are located on a plane parallel to the longitudinal direction of the pipe-like portion 2 is formed. Then, as shown in FIG. 13, the ends of the arm precursor member 25 are bent radially inward once, and then bent radially outward once. Through this process, the ring-shaped flange portions 4 having center holes 5 are formed so as to project inward from the openings 26 in the arm precursor member 25.

Figure 14:
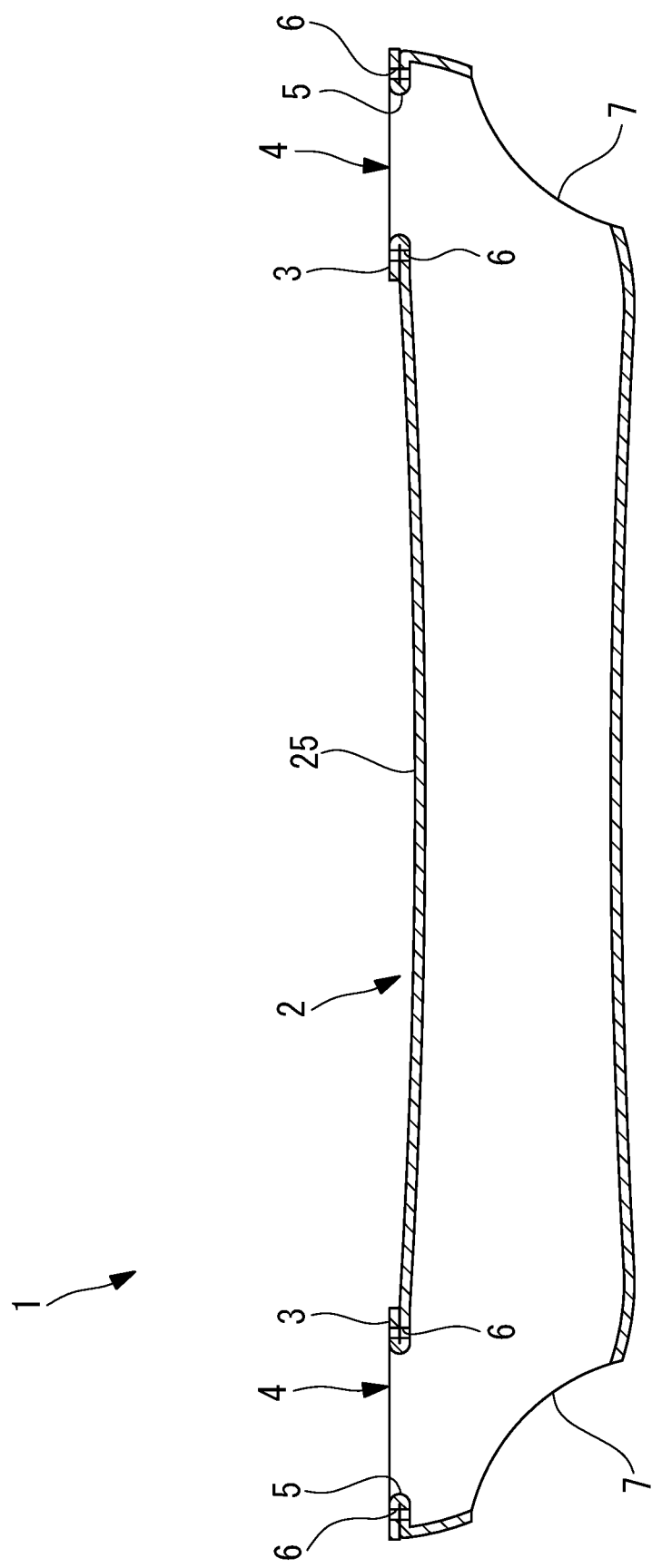
FIG. 14 is a vertical cross section of the arm-like structure in FIG. 1, which is formed by providing holes in the flange portions formed in FIG. 13 and providing work openings in shoulder portions.

Then, a plurality of through-holes 6 are provided in the ring-shaped flange portions 4, at intervals in the circumferential direction. Furthermore, wall portions facing the openings 26 in the arm precursor member 25, i.e., shoulder portions located at positions facing the openings 26 in the central axis direction of the center holes 5 at the flange portions 4 at the ends, are cut off to form work openings 7, as shown in FIG. 14. Through this process, the arm-like structure 1 shown in FIG. 1 is produced.

As described above, in the method for producing the arm-like structure 1 according to this embodiment, the arm-like structure 1 is formed by expanding the pipe-like materials 21, 22, 23, and 24 by bulge forming. This method has an advantage in that it is possible to easily produce a thin-walled (e.g., 2 mm to 3 mm thick) arm-like structure 1 having a uniform thickness, compared with a case where the arm-like structure is produced by casting. Note that the bulge forming includes both hot forming and cold forming.

Furthermore, after the straight-pipe-shaped material 21 is bent by bulge forming, the crank-shaped pipe-like second intermediate member 23 is expanded by bulge forming. This makes it possible to produce, from a single component, the arm-like structure 1 having a smooth curved shape and no steps on the surface thereof. The smooth curved shape is suitable for use in an arm-like structure of a cooperative robot, with which an operator can come into contact.

Furthermore, because the flange portions 4 are formed so as to project inward from the openings 26 in the arm precursor member 25, it is possible to provide an arm that does not have a projection on the outside of the arm-like structure 1 and thus is suitable for use in a cooperative robot.

Furthermore, because the work openings 7 are provided in wall portions facing the openings 26 in the arm precursor member 25, it is possible to provide an arm ensuring ease of assembly, in which tasks such as wiring of a wire body can be easily performed.

In this embodiment, because bulge forming is used as the method for bending the straight-pipe-shaped material 21 in a crank-shaped pipe, bending with a relatively small bend radius can be performed while suppressing variations in thickness.

Instead, when the third intermediate member 24 is formed by using the second die 40, a second intermediate member 23 formed in a crank-shaped pipe by another method may be used as the material.

Furthermore, the arm-like structure 1 produced as above may be at least partially subjected to a heat treatment, such as a T6 treatment. This makes it possible to produce an arm-like structure 1 that is made of a thin-walled light metal having even higher strength.

Furthermore, in this embodiment, the material 21, the first intermediate member 22, the second intermediate member 23, the third intermediate member 24, and the arm precursor member 25 may be subjected to a heat treatment for bringing the material properties and the properties changed in plastic working to a state suitable for working.

Figure 15:
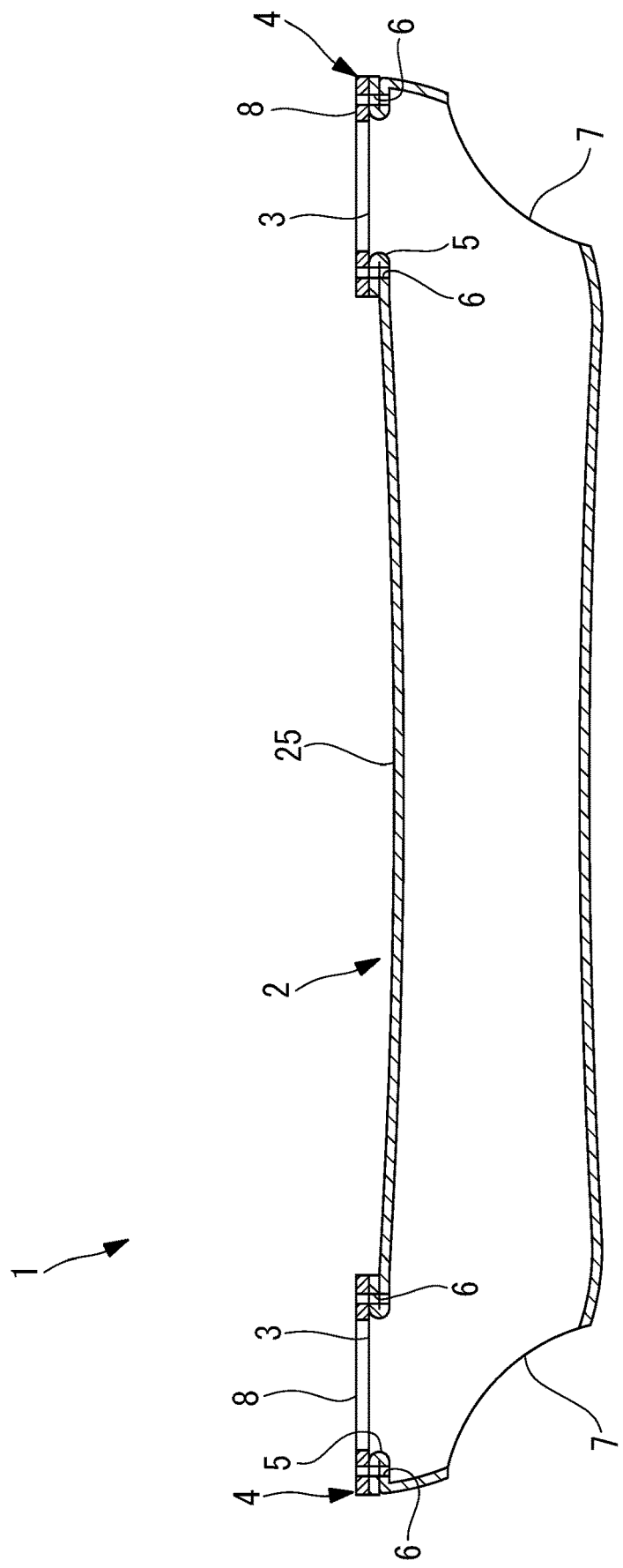
FIG. 15 is a vertical cross section showing a modification of the arm-like structure in FIG. 1.

Furthermore, although the flange portions 4 are formed by bending the ends of the arm precursor member 25 in the radial direction twice in this embodiment, the ends may be bent once or three or more times instead. Furthermore, as shown in FIG. 15, the strength of the flange portions 4 may be improved by joining ring-shaped reinforcing members 8 by rivets or the like.

Furthermore, as shown in FIGS. 12 and 13, although the flange portions 4 projecting inward from the openings 26 have been shown as an example in this embodiment, instead, the flange portions 4 may be provided so as to project outward from the openings 26.

Furthermore, although the arm-like structure 1 having two flange portions 4 has been shown as an example in this embodiment, the invention is not limited thereto and may be applied to an arm-like structure 1 having a single flange portion 4. Furthermore, although a case where the flange surfaces 3 are parallel to the length direction of the arm-like structure 1 has been shown as an example, the invention may be applied to a case where flange portions 4 extend in a direction intersecting the length direction of the arm-like structure 1.

Figure 16:
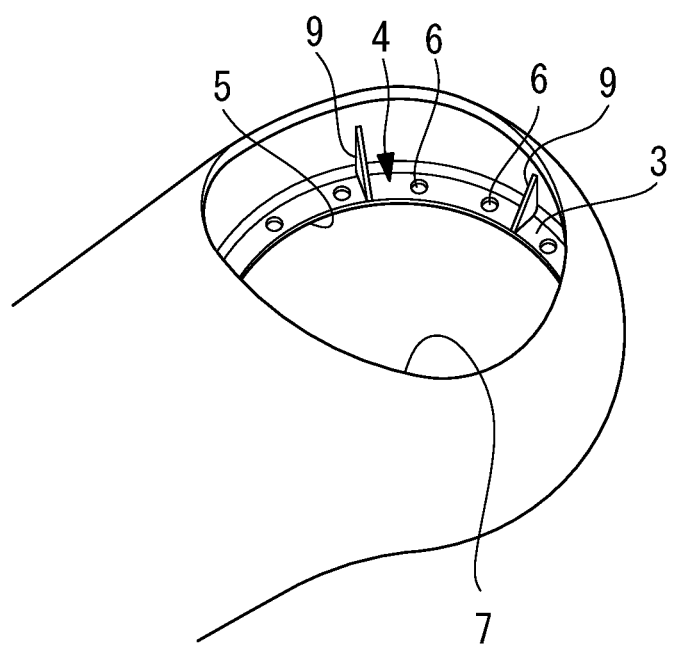
FIG. 16 is an enlarged perspective view showing another modification of the arm-like structure in FIG. 1.

Furthermore, in this embodiment, as shown in FIG. 16, reinforcing ribs 9 may be provided so as to extend between the rear side of attachment surfaces of the flange portions 4 and the inner wall surfaces of the ends of the pipe-like portion 2, more specifically, the inner surfaces between the work openings 7 and the flange portions 4. With this structure, the pipe-like portion 2 and the flange portions 4 can be more securely fixed.

Figure 17:
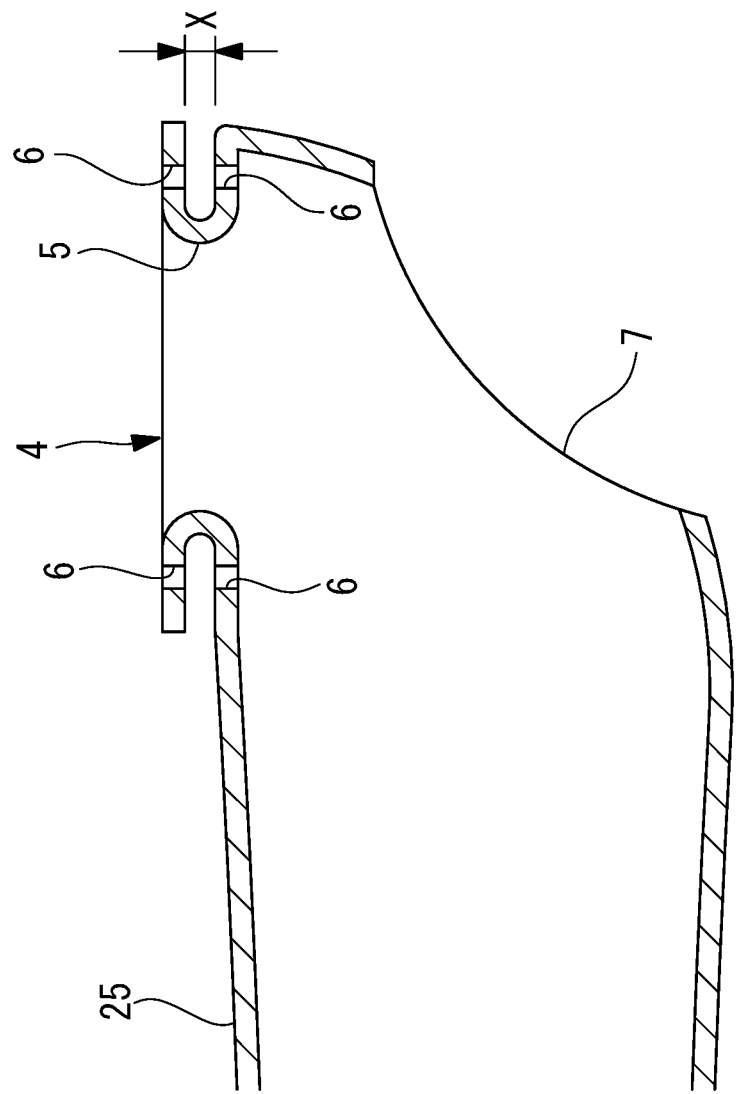
FIG. 17 is an enlarged vertical cross section showing another modification of the arm-like structure in FIG. 1.

Furthermore, although the flange portions 4 that are formed by bending the ends of the arm precursor member 25 radially outward such that opposed surfaces are in contact with each other, as shown in FIG. 13, has been shown as an example in this embodiment, instead, a structure in which the ends of the arm precursor member 25 are bent radially outward such that opposed surfaces are separated by a predetermined distance X, as shown in FIG. 17, is also possible. With this structure, when the arm-like structure 1 is attached to another member by fastening bolts inserted through the through-holes 6, the distance X is reduced by fastening the bolts. Thus, the flange portions 4 can provide an anti-loosening function similar to that provided by a spring washer.

The invention claimed is:

1. An arm structure comprising:
   a pipe portion; and
   a pair of ring shaped flange portions on each end of the pipe portion, each flange portion formed so as to define a center hole about a central axis of each flange portion,
   wherein the center holes are located in a plane parallel to a longitudinal direction of the pipe portion, and
   the pipe portion and the flange portions are unitarily formed by deforming a single pipe material, wherein the ends of the pipe portion are bent radially outward such that opposed surfaces are separated by a predetermined distance, and
   when the arm structure is attached to another member by fastening bolts inserted through through-holes of the flange portions, the predetermined distance is reduced by fastening the bolts.

2. A method of producing the arm structure of claim 1, comprising:
   forming an arm precursor member having an external shape of the arm structure by, in a state in which a die is closed with a metal pipe member being disposed in a cavity thereof, pressurizing the pipe member with liquid supplied to an inside thereof to cause an external surface of the thus expanded pipe member to be pressed against an inner surface of the cavity; and
   forming the flange portions to be attached to a driven body by machining at least an end of the formed arm precursor member.

3. The method of producing the arm structure according to claim 2, wherein the pipe member is formed by, in a state in which a first die is closed with a straight-pipe-shaped material being disposed in the cavity thereof, changing a shape of the cavity of the first die so that both ends of the material are bent in a same direction, while pressurizing the material with the liquid supplied to an inside thereof.

4. The method of producing the arm structure according to claim 3, wherein a work opening is formed by cutting off a portion of a wall of the arm precursor member or the arm structure.

5. The method of producing the arm structure according to claim 2, wherein the flange portion is formed in a ring shape having a center hole by bending an entire circumference of an end of the arm precursor member at least once in a radial direction.

6. The method of producing the arm structure according to claim 5, wherein the flange portions are formed by bending the end of the arm precursor member radially inward.

7. The method of producing the arm structure according to claim 5, wherein the flange portions are formed by joining a ring-shaped reinforcing member to the bent end of the arm precursor member.

8. The method of producing the arm structure according to claim 2, wherein a reinforcing rib is formed so as to extend between a rear side of an attachment surface of the flange portions and an inner wall surface of the arm precursor member or the arm structure.

9. The method of producing the arm structure according to claim 2, wherein heat treatment for improving strength is performed on at least a portion of the arm structure.

10. The method of producing the arm structure according to claim 2, wherein heat treatment for bringing changed material properties to a suitable state is performed on the arm structure.

11. The arm structure according to claim 1, wherein work openings are provided in wall portions of the pipe portion facing the center hole.

* * * * *